(12) United States Patent  
Asakura et al.

(10) Patent No.: US 8,875,825 B2  
(45) Date of Patent: Nov. 4, 2014

(54) POWER CONTROL UNIT (75) Inventors: Ken Asakura, Toyota (JP); Yutaka Hotta, Chiryu (JP); Tatsuyuki Uechi, Toyoake (JP)

(73) Assignees: Toyota Jidosha Kabushiki Kaisha, Toyota-Shi (JP); Aisin AW Co., Ltd., Anjo-Shi (JP)

( * ) Notice: Subject to any disclaimer, the term of this patent is extended or adjusted under 35 U.S.C. 154(b) by 0 days.

(21) Appl. No.: 13/984,193

(22) PCT Filed: Feb. 8, 2012

(86) PCT No.: PCT/IB2012/000223  
§ 371 (c)(1),  
(2), (4) Date: Aug. 7, 2013

(87) PCT Pub. No.: WO2012/107826  
PCT Pub. Date: Aug. 16, 2012

(65) Prior Publication Data  
US 2014/0084719 A1 Mar. 27, 2014

(30) Foreign Application Priority Data  
Feb. 10, 2011 (JP) ................. 2011-027054

(51) Int. Cl.  
B60K 11/02 (2006.01)  
B60K 6/405 (2007.10)  
H02K 9/19 (2006.01)  
B60K 1/00 (2006.01)  
B60R 13/08 (2006.01)

(52) U.S. Cl.  
CPC ............ *H02K 9/19* (2013.01); *B60K 2001/003* (2013.01); *B60K 6/405* (2013.01); *B60Y 2306/05* (2013.01); *B60R 13/0876* (2013.01); *B60K 11/02* (2013.01); *B60Y 2400/61* (2013.01)  
USPC ............... 180/68.4; 310/52; 310/53; 310/54; 62/259.2

(58) Field of Classification Search  
CPC . H02K 9/19; H02K 2209/00; H02K 2211/03; H02K 5/02; H02K 5/08; H02K 5/20; H05K 7/20218; B60K 6/26; B60K 6/40; B60K 6/405; B60K 11/02; B60K 2001/003; B60Y 2306/05; B60Y 2400/61  
USPC .................... 180/68.4; 310/52–54, 65, 67 R; 361/699; 62/259.2  
See application file for complete search history.

(56) References Cited

U.S. PATENT DOCUMENTS 5,040,381 A * 8/1991 Hazen ............................. 62/3.2  
5,491,370 A * 2/1996 Schneider et al. .............. 310/54  
(Continued)

FOREIGN PATENT DOCUMENTS

JP 08-051743 2/1996  
JP 2000-217308 A 8/2000  
(Continued)

*Primary Examiner* — J. Allen Shriver, II  
*Assistant Examiner* — Steve Clemmons  
(74) *Attorney, Agent, or Firm* — Kenyon & Kenyon LLP (57) ABSTRACT A power control unit that controls a rotary electric machine that drives a vehicle, and that is mounted onto a motor case in which the rotary electric machine is housed, includes a fixed base that is made of resin; a cooler that is arranged on the fixed base and that includes a power module; and a control substrate that is arranged on the cooler. The fixed base inhibits conduction of heat from the motor case to the power control unit.

7 Claims, 5 Drawing Sheets

(56) References Cited

U.S. PATENT DOCUMENTS

| | | | |
|---|---|---|---|
| 5,585,681 A * | 12/1996 | Bitsche | 310/54 |
| 5,814,909 A | 9/1998 | Yamada et al. | |
| 6,166,498 A * | 12/2000 | Yamaguchi et al. | 318/34 |
| 7,102,260 B2 * | 9/2006 | Takenaka et al. | 310/64 |
| 7,210,304 B2 * | 5/2007 | Nagashima | 62/259.2 |
| 7,211,912 B2 * | 5/2007 | Takenaka et al. | 310/54 |
| 7,525,224 B2 * | 4/2009 | Takenaka et al. | 310/54 |
| 7,728,467 B2 * | 6/2010 | Aoki et al. | 310/54 |
| 7,796,389 B2 * | 9/2010 | Edmunds et al. | 361/700 |
| 7,977,830 B2 * | 7/2011 | Yoshida et al. | 310/54 |
| 8,007,255 B2 * | 8/2011 | Hattori et al. | 417/410.1 |
| 8,556,011 B2 * | 10/2013 | Anwar et al. | 180/65.275 |
| 2005/0168081 A1 * | 8/2005 | Takenaka et al. | 310/64 |
| 2006/0064998 A1 * | 3/2006 | Funahashi et al. | 62/228.4 |
| 2007/0240662 A1 * | 10/2007 | Kitamura et al. | 123/179.4 |
| 2008/0179736 A1 * | 7/2008 | Hartwell et al. | 257/714 |
| 2008/0181280 A1 * | 7/2008 | Wang et al. | 374/1 |
| 2009/0195093 A1 * | 8/2009 | Bandai et al. | 310/54 |
| 2009/0250271 A1 * | 10/2009 | Komatsu et al. | 180/65.6 |
| 2009/0251018 A1 * | 10/2009 | Koshida | 310/89 |
| 2010/0175933 A1 | 7/2010 | Yoshida | |

FOREIGN PATENT DOCUMENTS

| | | |
|---|---|---|
| JP | 2008-072813 A | 3/2008 |
| JP | 2008-218732 A | 9/2008 |
| JP | 2011-223744 A | 11/2011 |
| WO | WO 2009072491 A1 * | 6/2009 |

* cited by examiner

FIG. 1

CROSS SECTION H–H

POWER CONTROL UNIT

CROSS REFERENCE TO RELATED APPLICATION

This is a national phase application based on the PCT International Patent Application No. PCT/IB2012/000223 filed on Feb. 8, 2012, claiming priority to Japanese application No. 2011-027054, filed Feb. 10, 2011, the entire contents of both of which are incorporated herein by reference.

BACKGROUND OF THE INVENTION

1. Field of the Invention

The invention relates to a power control unit that controls a rotary electric machine that drives a vehicle, and that is mounted onto a motor case in which the rotary electric machine is housed.

2. Description of Related Art

Electric vehicles in which the vehicle is driven by driving force from a rotary electric machine such as a motor-generator, hybrid vehicles in which the vehicle is driven by a combination of a rotary electric machine and an engine that is an internal combustion engine, and fuel cell vehicles in which the vehicle is driven by electric power generated by a fuel cell, and the like are known. These kinds of vehicles are equipped with a PCU (power control unit) that receives a supply of electric power from a battery, and has a step up converter and an inverter and the like that control the electric power to a motor-generator (hereinafter, also referred to as "motor").

Typically, in order to operate the motor efficiently, high voltage must be supplied. For example, a hybrid vehicle provided with a step up converter that steps up battery voltage of approximately 200 volts to approximately 600 volts is known. The step up converter includes a switching element and a reactor that is connected to the switching element. The reactor includes a core that uses magnetic material, such as an iron core, and a coil that is provided with the core. Also, the step up converter stores and releases electric power to and from the reactor by controlling the switching element on and off, thus enabling the voltage that is supplied from the battery to be stepped up and supplied to the inverter. At this time, in the reactor, the core generates heat from electromagnetic energy conversion, and the coil generates heat from the Joule heat of flowing current. If the heat is not suitably released, the temperature of the reactor will rise and the voltage conversion efficiency of the step up converter will decrease, so heat must be suitably released from the reactor. Thus, regarding heat release from a reactor, there is technology for releasing heat by cooling fins on the reactor, and technology for releasing heat using coolant, and the like.

Japanese Patent Application Publication No. 2008-72813 (JP-A-2008-72813) describes a drive apparatus of a hybrid vehicle that is provided with a step up converter of which a reactor is a constituent element. With the drive apparatus described in JP-A-2008-72813, in order to promote heat release from the reactor when the inverter and the motor are arranged together in a single case, lubricating oil that has been drawn up by the rotation of a motor-generator is made to flow into a housing chamber in which the reactor is housed, and the reactor is cooled by the lubricating oil stored in the housing chamber.

Figure 5:
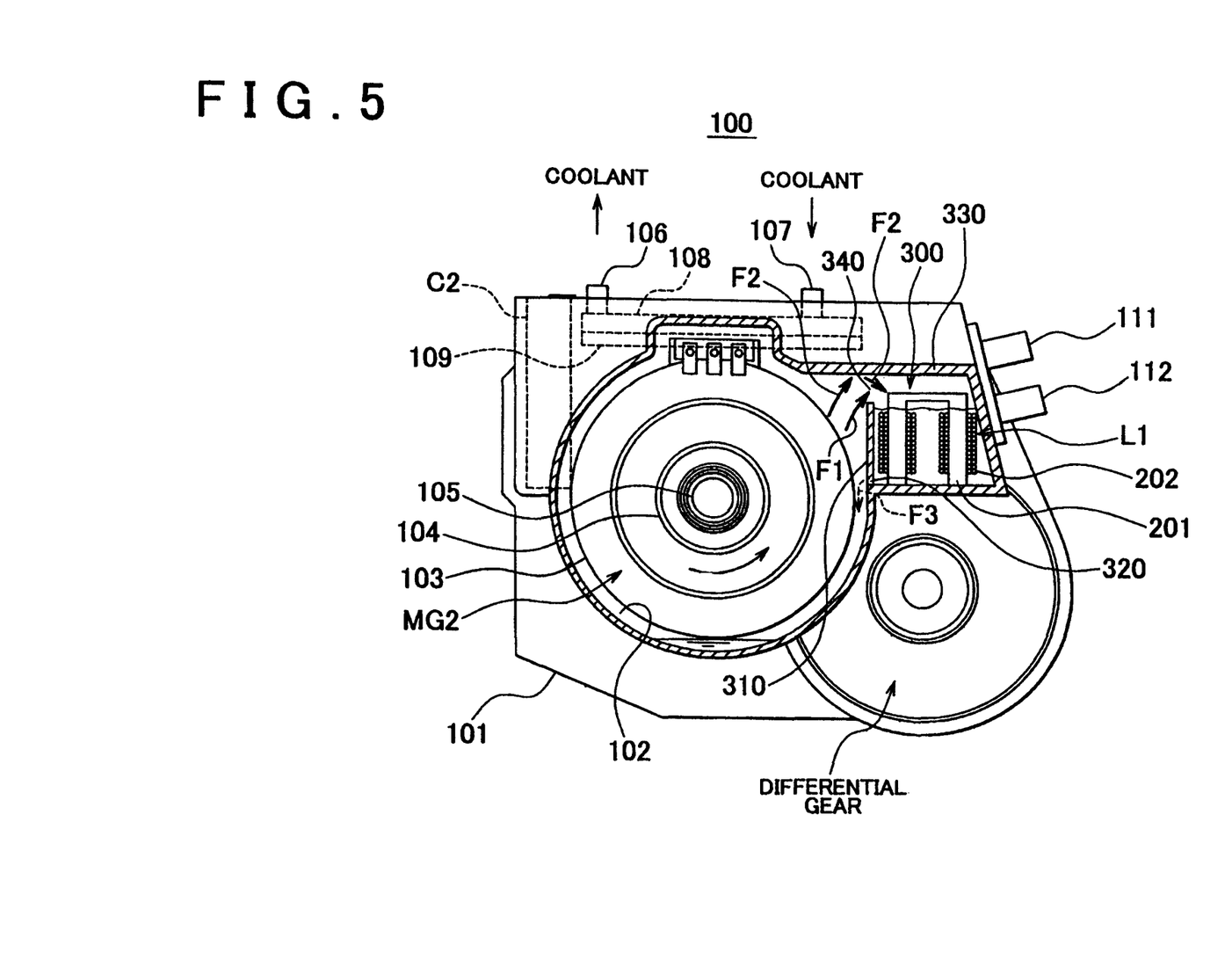
FIG. 5 is a schematic diagram showing a drive apparatus according to related art.

FIG. 5 is a view of a drive apparatus 100 according to related art, and shows a cross section of a motor-generator MG2 and a reactor L1 on the front side, and a differential gear, a power element substrate 109, a capacitor C2, and a cooler 108 having cooling vents 106 and 107 behind the motor-generator MG2 and the reactor L1. Lubricating oil is drawn up as shown by arrows F1 and F2, by the rotation of the motor-generator MG2, and lubricating oil that has passed through an open portion 340 in the housing chamber flows into a reactor housing chamber 300. The lubricating oil that flows in cools the reactor L1 and is discharged from an oil drain hole 320 to an open portion 102 as shown by arrow F3. This kind of structure makes it possible to ensure the cooling ability of the reactor L1.

As described above, with technology for cooling the reactor L1 using lubricating oil when motor-generators MG1 and MG2, a step up converter for driving these motors, and an inverter are all housed together, the temperature of the lubricating oil is regulated by coolant that cools a motor case and an engine case, so during normal operation, the coolant temperature and the oil temperature are substantially the same temperature (for example, approximately 85° C. to approximately 90° C.). On the other hand, in a heavy-load operating state, the heat rapidly generated by the engine and the motor-generators causes the oil temperature to become higher than the coolant temperature, so not only is the ability to cool the reactor a concern, but the transfer of heat to the step up converter and the inverter that are arranged near the reactor is also a concern.

The step up converter and the inverter and the like have power element substrates, and the temperature of these power element substrates is regulated by the temperature of the coolant in the cooler 108. Normally temperature regulation is performed by a large radiator and fan, but if heat exceeding the capacity of the cooler 108 is transferred to the cooler 108 in a heavy load state, the running performance of the vehicle may decrease due to output limiting control that accompanies a rise in the temperature of the power elements.

In particular, when the step up converter and the inverter that form the power control unit are arranged together with the motor in a single case as described above, the temperature of the power control unit will rise from heat conduction from the case, heat conduction from an aluminum die-cast cover that covers the power control unit, and the convective heat of the air inside the cover.

SUMMARY OF THE INVENTION

The invention provides a power control unit that is mounted in such a way that cooling ability of the power control unit is ensured, even when a step up converter and an inverter that form the power control unit are housed together with a motor in a single case.

One aspect of the invention relates to a power control unit that controls a rotary electric machine that drives a vehicle, and that is mounted onto a motor case in which the rotary electric machine is housed. This power control unit includes a fixed base that is made of resin; a cooler that is arranged on the fixed base and that includes a power module; and a control substrate that is arranged on the cooler. The fixed base inhibits conduction of heat from the motor case to the power control unit. This kind of structure enables the conduction of heat from the motor case to be inhibited, so a decrease in output that accompanies a rise in temperature of the power module can be prevented.

In the power control unit described above, the fixed base may cover a bottom surface of the power control unit, and the power control unit may be connected to the rotary electric machine inside of the motor case via the fixed base.

In the power control unit described above, the fixed base may include a terminal block that includes a bus bar that connects the rotary electric machine to the power control unit. With this kind of structure, a heat release effect can be expected from the bus bar.

In the power control unit having the structure described above, thin plate made of metal that inhibits the conduction of heat between the cooler and the fixed base, and fixing means for fixing the cooler, the thin plate, and the fixed base together, may be provided with the fixed base. The thin plate may form a space that is surrounded by the cooler and the thin plate, and the thin plate may be cooled by the cooler. According to this kind of structure, the space between the cooler and the thin plate can be used effectively, and the space between the fixed base and the thin plate can also be used as an insulating chamber, so convection heating from heated air can be prevented.

In the power control unit having the structure described above, an electronic device may be arranged in the space that is surrounded by the cooler and the thin plate. This kind of structure makes it possible to effectively cool the electronic device with the cooler.

In the power control unit having the structure described above, the thin plate may form a space that is surrounded by the fixed base and the thin plate.

The power control unit having the structure described above may also include a cover that is formed by a thin plate made of metal and that covers the power control unit. The cover may be attached to a base of the motor case, such that the fixed base is surrounded by the cover or the motor case, and the conduction of heat from the motor case to the power control unit is inhibited by the cover.

In the power control unit having the structure described above, the base of the motor cover may surround a periphery of the fixed base.

The invention makes it possible to provide a power control unit that is mounted in such as way that the temperature of the power control unit is able to be prevented from rising, and thus the cooling ability of the power control unit is able to be ensured, even when the step up converter and the inverter that form the power control unit are housed together with the motor in a single case, by inhibiting heat conduction from the case, heat conduction from the cover that covers the power control unit, and convection heat of the air inside the cover.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described with reference to the accompanying drawings.

Figure 1:
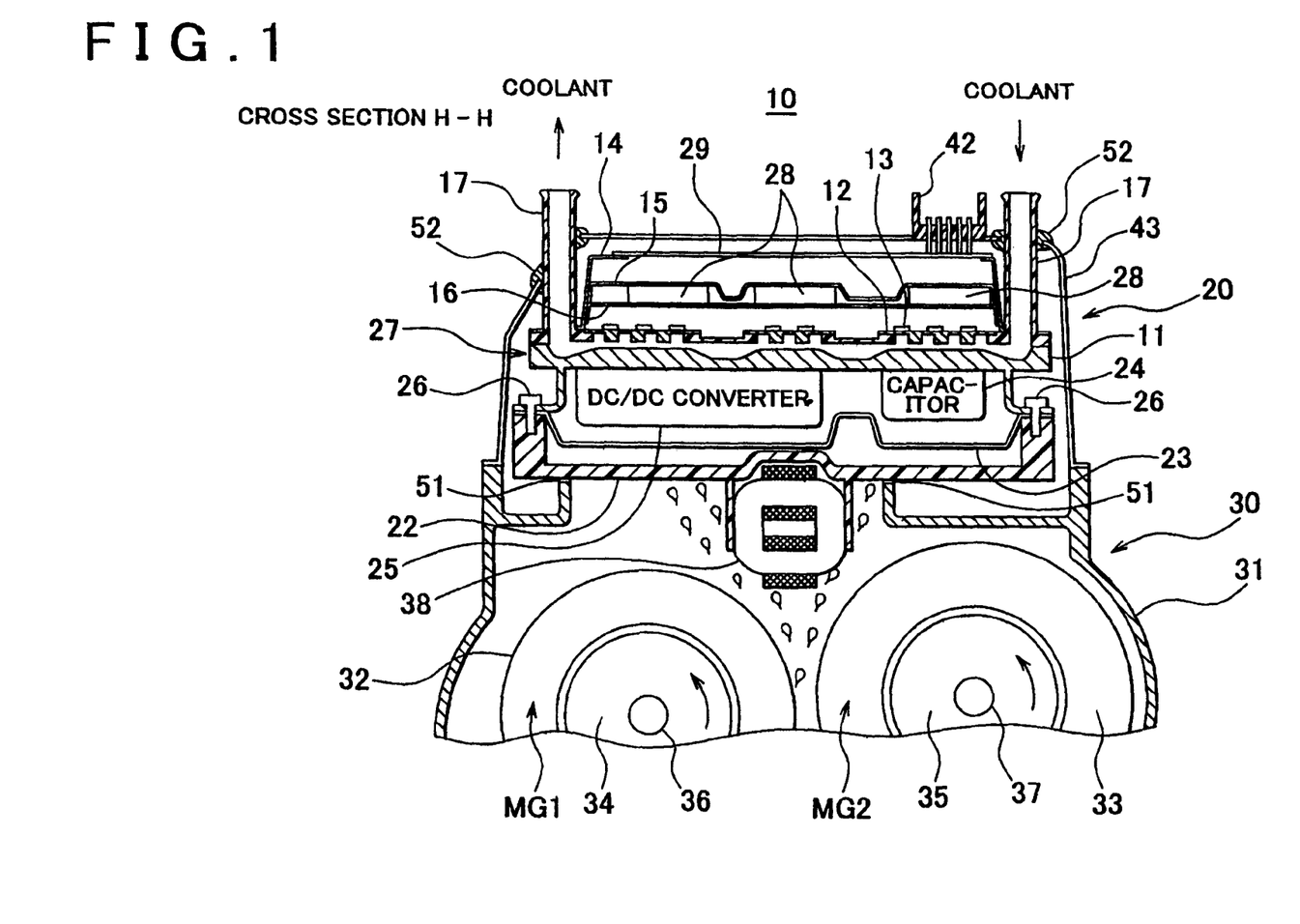
FIG. 1 is a structural diagram of a drive apparatus with a power control unit according to the invention.
Figure 2:
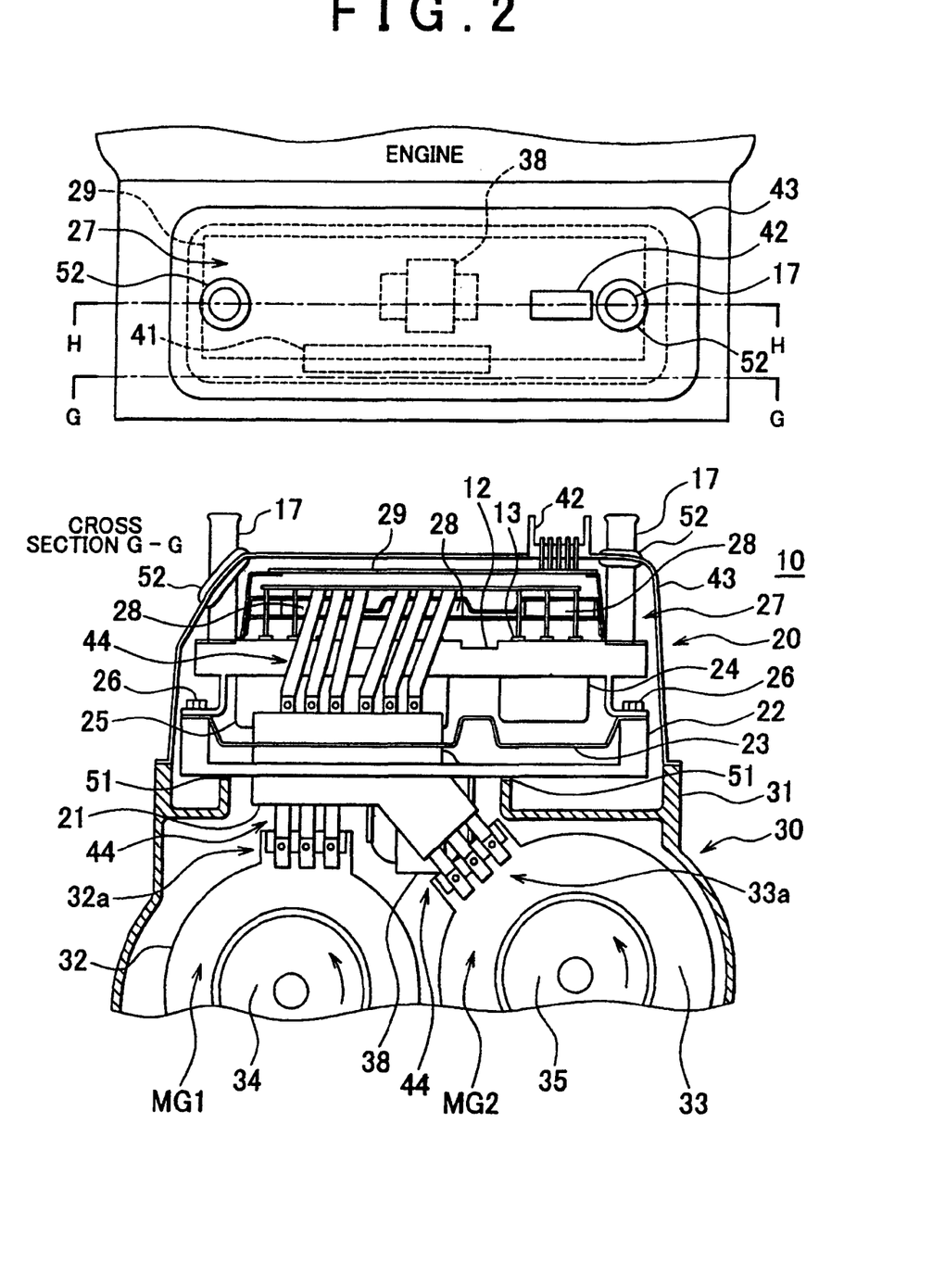
FIG. 2 is a schematic diagram of the drive apparatus with the power control unit according to the invention.

FIG. 1 is a view of a drive apparatus 10 with a power control unit (PCU), and FIG. 2 is a front view and a plan view of the drive apparatus 10 shown in FIG. 1. The upper portion of FIG. 2 is a plan view of the drive apparatus 10, and the lower portion of FIG. 2 is a front view of a cross section taken along line G-G. First, the overall structure of the drive apparatus 10 will be briefly described with reference to FIG. 2.

The drive apparatus 10 in FIG. 2 includes a transaxle 30 that has motor-generators MG1 and MG2 that are connected to an engine via a power distributing apparatus, a fixed base 22 that is made of resin and is arranged covering an open portion of a transaxle case 31, a thin plate 23 made of steel sheet that is arranged on the fixed base 22, a cooler 27 arranged on the thin plate 23, smoothing capacitors 28 arranged above the cooler 27, a control substrate 29 arranged above the smoothing capacitors 28, and a cover 43 made of steel sheet that covers all of these. The cooler 27 has a resin portion on an upper surface, an aluminum portion on a lower surface, and a heat conductive base 12 that conducts heat well, has fins on the inside, and is attached to the resin portion on the upper surface. A DC/DC converter 25 and a filter capacitor 24 are arranged on the lower surface of the cooler 27, and power elements 13 are arranged via the heat conductive base 12 on the upper surface of the cooler 27. Also, an external connector 42 is provided on the upper surface of the control substrate 29. The cover 43 is attached by bolts to a flange portion of the transaxle case 31, and rubber rings 52 are provided in gaps between cooling lines 17 of the cooler 27 and the cover 43. Further, a reactor 38 is arranged on the lower surface of the fixed base 22. This reactor 38 is cooled by lubricating oil sprayed up by the rotation of rotors 34 and 35 of the motor-generators MG1 and MG2 housed inside the transaxle case 31.

The fixed base 22 in FIG. 2 has a terminal block 21. A bus bar 44 that extends from stator coil terminals 32a and 33a of the motor-generators MG1 and MG2 is connected, with branches, to the plurality of power elements 13 fixed to the cooler 27, via the terminal block 21. Therefore, some of the heat released from the power elements 13 is released into the PCU case via the bus bar 44. Also, the fixed base 22 is connected via a surface seal 51 to the transaxle case 31, so the transaxle 30 is sealed by the fixed base 22. With this kind of structure, the PCU 20 according to this example embodiment reduces the number of parts by being connected by the bus bar 44 that is connected via the terminal block 21, instead of a wire harness that connects the motor-generators MG1 and MG2 together. Moreover, having the fixed base 22 that separates the PCU 20 from the transaxle 30 be made of resin that is less heat conductive than the aluminum transaxle case 31 makes it possible to inhibit heat from being conducted from the transaxle 30 to the PCU 20. Next, the drive apparatus 10 in FIG. 1 that shows a cross section taken along line H-H in the upper drawing in FIG. 2 will be described.

FIG. 1 is a sectional front view of the drive apparatus 10 taken along line H-H. The mounting structure of the power control unit (PCU) according to the invention will be described in detail with reference to FIG. 1. Portions that have already been described will be omitted in order to avoid redundant descriptions. The drive apparatus 10 in FIG. 1 includes a transaxle chamber formed by covering the transaxle case 31 that has an open portion by the fixed base 22, and a PCU chamber that is divided by the fixed base 22 and the cover 43. In the transaxle chamber are arranged the stators 32 and 33 that form the motor-generators MG1 and MG2, the rotors 34 and 35 that are arranged inside the stators and rotate about shafts 36 and 37, and the reactor 38 that is arranged on the lower surface of the fixed base 22.

Also, the PCU chamber is formed by the thin plate 23 that is made of steel sheet and arranged on the fixed base 22, the cooler 27 that is arranged on the thin plate 23, the smoothing capacitors 28 and the control substrate 29 that are arranged above of the cooler 27, and the cover 43 that is made of steel sheet and is attached to the transaxle case 31 so as to cover from the fixed base 22 to the control substrate 29. The thin plate 23 and the cooler 27 form an insulating chamber by being fastened to the fixed base 22 by bolts 26, such that the conduction of heat from the transaxle 30 is inhibited. Furthermore, the cover 43 that is made of steel sheet and is attached to the transaxle case 31 is thinner and has lower heat conductivity than the aluminum wall surface, and thus inhibits the conduction of heat from the transaxle 30. Next, cooling means will be described.

The drive apparatus 10 in FIG. 1 has two cooling means. The first cooling means is the cooler 27 that cools the power elements 13, the DC/DC converter 25, the filter capacitor 24, the smoothing capacitors 28, and the control substrate 29. The second cooling means is lubricating oil that cools the reactor 38 by being sprayed by the rotation of the rotors 34 and 35 about the shafts 36 and 37 of the motor-generators MG1 and MG2. In a typical vehicle, an oil cooler is not provided, so lubricating oil is cooled by heat being released from the oil pan and by coolant that cools the engine. Therefore, in a heavy-load operating state, the temperature of the lubricating oil may become higher than the temperature of the coolant.

Figure 3:
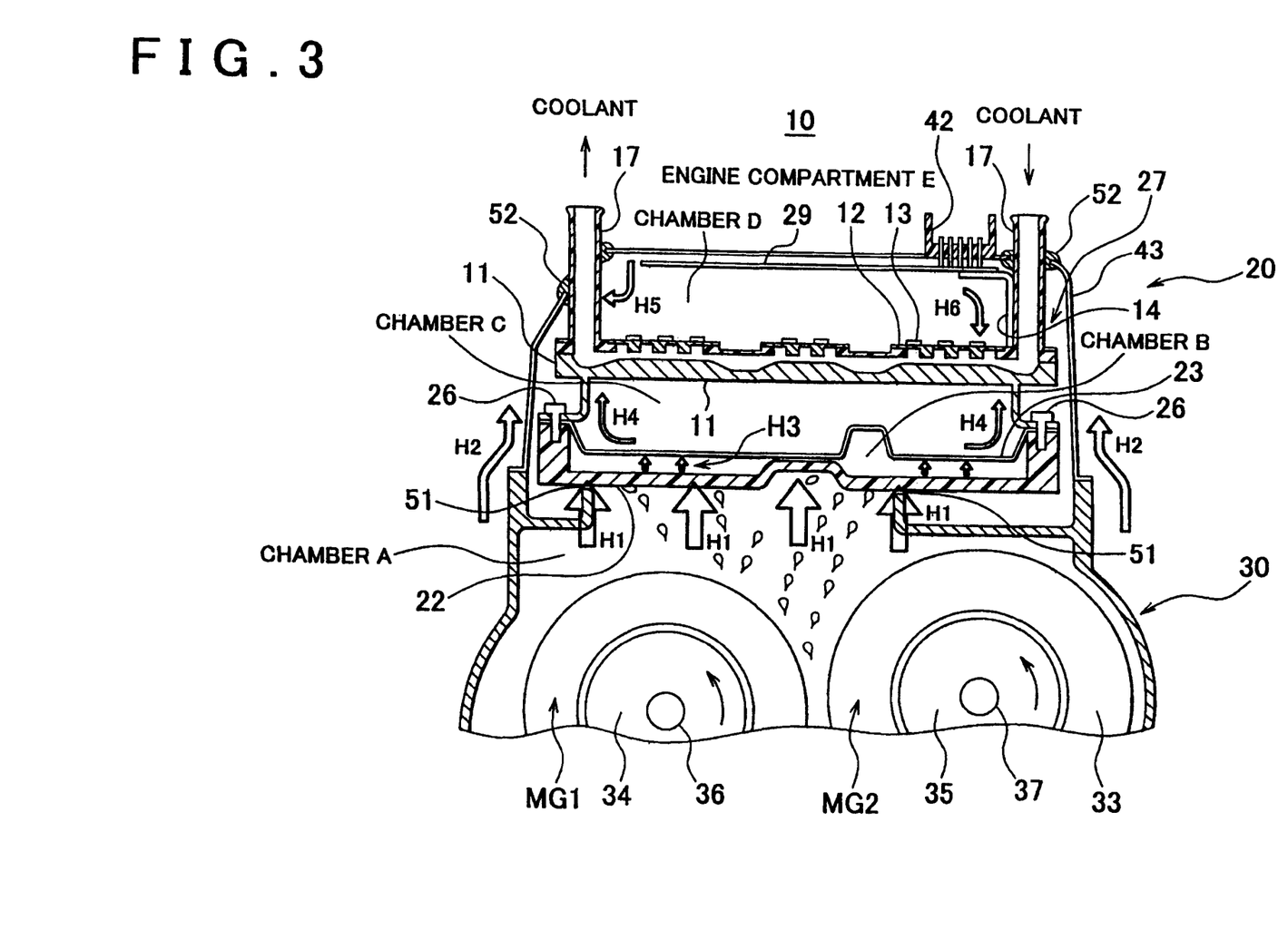
FIG. 3 is a view showing housing chambers of the drive apparatus with the power control unit according to the invention.
Figure 4:
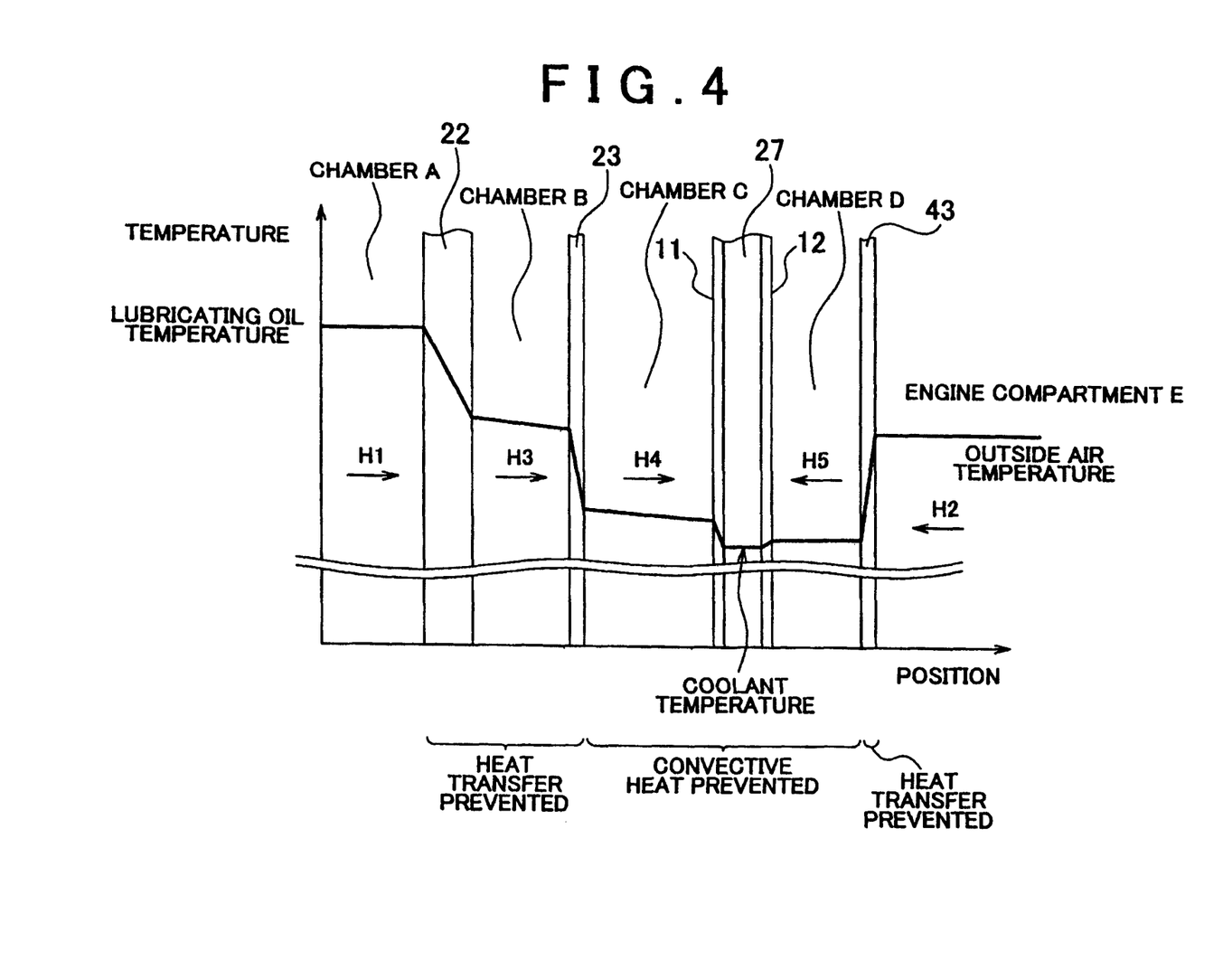
FIG. 4 is a temperature graph diagram showing an overview of the temperature in each of the housing chambers shown in FIG. 3.

FIG. 3 is a view showing the amount of heat (also referred to as "heat quantity) (H1 to H5) and housing chambers (chamber A to chamber D and engine compartment E) of the drive apparatus with the power control unit. FIG. 4 is a temperature graph diagram showing an overview of the temperature in each of the housing chambers shown in FIG. 3. In particular, the conduction of heat when the temperature of the lubricating oil is higher than the temperature of the coolant in a heavy-load operating state will be described in detail. The amount of heat=specific heat×density×volume×temperature difference. The specific heat ($J/(kg \times K)$) is the amount of heat necessary to increase the temperature of an object with a unit mass (1 kg) by a unit temperature (1 K). Heat conduction includes heat conductivity ($W/(m \times K) = J/(s \times m \times K)$), that is a value indicative of the amount of heat that it takes to transfer 1 K one meter downstream in one second, and a heat transfer coefficient ($W/(m^2 \times K) = J/(s \times m^2 \times K)$), that is a value indicative of the amount of heat that it takes to transfer 1 K from an area 1 $m^2$ in one second. Heat conduction will hereinafter be described using one or both of these values or the like, but for the sake of convenience in the description, the amount of heat is used, and the devices of the power control unit in FIG. 3 are omitted.

In a heavy-load operating state, the temperature on the transaxle 30 side in FIG. 3 becomes higher than the temperature of the coolant on the PCU 20 side. More specifically, the spray of lubricating oil in chamber A inside of the transaxle case in FIG. 3 causes a first heat quantity H1 to be applied to the fixed base 22. For example, the fixed base 22 is made of thermosetting resin (such as phenolic resin with a specific heat of 1.57 to 1.76 $j/g \times K$) having a bus bar inside by insert molding. Therefore, compared with the aluminum partition wall, the specific heat is greater (the specific heat of aluminum is 0.9 $j/g \times K$) and the heat conductivity is smaller. Accordingly, in the temperature graph in FIG. 4, when the first heat quantity H1 passes through the fixed base 22, it becomes a second heat quantity H3. Also, even though a third heat quantity H2 that has passed through the partition wall of chamber A in FIG. 3 reaches the cover 43 that covers the PCU 20, it is cooled by the air current in chamber D, so the temperature of the cover 43 becomes a temperature that is sufficiently lower than the temperature of the transaxle case, as shown on the right side of FIG. 4.

The end portion of the thin plate 23 in FIG. 3 is fastened to the end portion of the cooler 27, and thus conducts heat from the thin plate 23 to the cooler 27, such that the second heat quantity H3 that has passed through chamber B formed by the fixed base 22 and the thin plate 23 in FIG. 4 becomes low. Furthermore, a fourth heat quantity H4 that passes through chamber C formed by the thin plate 23 and a cooler base 11 in FIG. 3 is near the cooler 27, so although there is heat conduction by convective heat, it is a temperature that is very near the coolant temperature. Similarly, a fifth heat quantity H5 that passes through chamber D formed by the cover 43 and the heat conductive base 12 in FIG. 3 also becomes heat conducted by convective heat, but it is near the cooler 27, so it becomes a temperature that is very close to the coolant temperature, and as a result, the heat of the power elements is able to be released.

As described above, using the power control unit (PCU) according to the invention enables heat transfer to be prevented in chamber B that is formed by the fixed base 22 and the thin plate 23, and the engine compartment E that is formed by the transaxle case 31 and the cover 43, and moreover, as well as enables convective heat to be prevented in chambers C and D that are formed one on either side of the cooler 27, in a structure in which a step up converter and an inverter that form a power control unit are arranged together with a motor in a single case. This kind of function makes it possible to prevent the temperature of the power control unit from rising, and thus ensure the cooling ability of the power control unit. Also, the thin plate 23 also functions as a cover for the DC/DC converter 25 and the filter capacitor 24, and is thus effective for preventing foreign matter from getting in.

In this example embodiment, the fixed base 22 is made of phenolic resin, but the invention is not limited to this. That is, the fixed base 22 may be made of any material as long as insert molding is possible and the material has heat resistant and oil resistant properties.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

The invention claimed is:

1. A power control unit that is configured to control a rotary electric machine that drives a vehicle, and to be mounted onto a motor case in which the rotary electric machine is housed, comprising:
  a fixed base that is made of resin;
  a cooler that is arranged on the fixed base and that includes a power module;
  a control substrate that is arranged on the cooler;
  a thin plate made of metal, the thin plate being configured to inhibit conduction of heat between the cooler and the fixed base; and
  a fixing member that fixes the cooler, the thin plate, and the fixed base together, the fixing member being provided with the fixed base;
  wherein the thin plate defines a space that is surrounded by the cooler and the thin plate, the thin plate being cooled by the cooler, and wherein the fixed base is configured to inhibit conduction of heat from the motor case to the power control unit.

2. The power control unit according to claim 1, wherein the fixed base covers a bottom surface of the power control unit; and the power control unit is connected to the rotary electric machine inside of the motor case via the fixed base.

3. The power control unit according to claim 2, wherein the fixed base includes a terminal block that includes a bus bar that connects the rotary electric machine to the power control unit.

4. The power control unit according to claim 1, wherein an electronic device is arranged in the space that is surrounded by the cooler and the thin plate.

5. The power control unit according to claim 1, wherein the thin plate forms a space that is surrounded by the fixed base and the thin plate.

6. The power control unit according to claim 1, further comprising a cover that is formed by a thin plate made of metal and that covers the power control unit, wherein the cover is attached to a base of the motor case, such that the fixed base is surrounded by the cover or the motor case, and the conduction of heat from the motor case to the power control unit is inhibited by the cover.

7. The power control unit according to claim 6, wherein the base of the motor cover surrounds a periphery of the fixed base.

* * * * *